Figure 1:
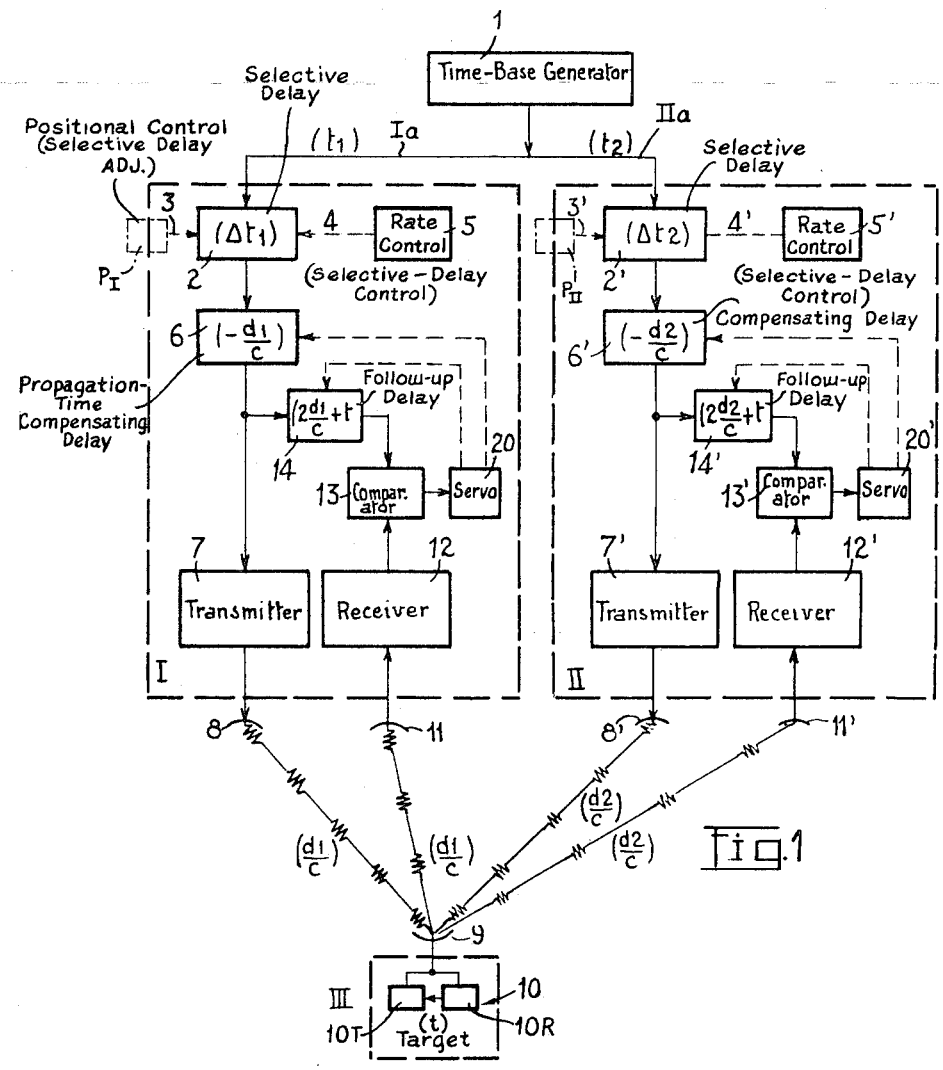

United States Patent Office 3,222,672
Patented Dec. 7, 1965

3,222,672
RADAR SYSTEM WITH CONTINUOUS
SEQUENCING MEANS
Henri G. P. Forestier, Paris, France, assignor to Compagnie Francaise Thomson-Houston, Paris, France, a corporation of France
Filed June 26, 1963, Ser. No. 290,835
Claims priority, application France, July 3, 1962, 902,760, Patent 1,344,274
13 Claims. (Cl. 343—7.5)

This invention relates to radar tracking systems including at least one radar station adapted to transmit a train of recurrent radar signals towards a target in motion with respect thereto and to receive response signals therefrom so as to derive range and/or positional information concerning the target whereby the latter can be tracked. The invention is more specifically directed to radar tracking systems including a chain of two or more fixed ground stations cooperating with a common airborne target, that is to be tracked for any purpose. In systems of this kind, the target is usually equipped with transponder means, i.e., a signal receiver and a transmitter arranged to be triggered by the receiver for retransmitting signals constituting the response signals received by the tracking stations.

In such systems difficulties have been encountered due to the lack of synchronization between the times of reception at the target, of signals emanating from different stations of the chain. Signals from two different stations can well reach the target at times separated by a time interval less than the recovery time of the transponder, i.e., the time lapse required to reenergize the transmitter. When such a condition arises the target will only respond to the first of the two stations interrogating it, while the next station is denied the response normally due it. Such "capture" of target response by one of the stations of the tracking chain can result in the system losing track of the target.

Through operational analysis it is possible to determine the optimum operating conditions in a given tracking system required to prevent such frustrating situations from arising in any of the possible relative configurations liable to occur between the ground stations and moving target with due regard to the parameters involved, including the geometry of the tracking chain, target trajectory and velocity, target recovery time, and the like.

In any case, the corrective measures to be applied will necessarily involve as a basic and indispensable step, a proper synchronization of the times of reception of the signals from the various radar stations of the chain at the common target transponder, and further, a proper time distribution or spreading of such reception times in order to ensure that signals emanating from different stations will in no case reach the target within a time interval less than the recovery time of the transponder.

Objects of this invention include the attainment of these various results, and the consequent improvement in the performance of radar systems of the kind described. More explicitly, the basic object of the invention is to synchronize the reception time of recurrent radar signals at a target so that such signals will be received at strictly controllable, e.g., constant, time intervals, regardless of the relative motion present between the target and the radar transmitter or transmitters from which the signals emanate. Another object is to spread out the reception times of radar signals from a plurality of cooperating radar stations of a tracking chain at a common target, in such manner as to enable the target to respond correctly to all the signals reaching it from different stations and thereby avoid "response capture" by any one station and consequent loss of tracking by another station of the chain. Additional objects will become apparent hereinafter.

According to a basic aspect of the invention, I provide means for so controlling the times at which a radar station transmits recurrent radar signals towards a target (equipped with receiving-and-retransmitting means) in motion with respect to the station, in dependence upon the instantaneous distance of the target from the station as determined by the conventional range-finding means normally present at said station, that the transmitted signals will reach the target at controllably, generally uniformly, spaced intervals. In accordance with a further aspect of the invention, means are provided at each of a chain of radar stations adapted to track a common target in motion with respect to said stations, for varying the transmission timing of the recurrent signals from said station in dependency on the station-to-target distance as determined by the range-finding means present at each station, in such manner that the recurrent signals from each station will reach the target at controllably spaced intervals and that the reception times of the signals emanating from different stations at the target will be controllably spread in time to enable the target to respond to the signals from each and every station regardless of the current positional and velocity configuration of the moving target and the stations of the chain.

According to a feature of the invention, isochronic time-base signals generated by a conventional time-base generator associated with the radar station or common to all the stations of a chain, are suitably delayed under the control of the target-range indication as provided by the range-finding means associated with the, or each, station to derive modified timing signals causing the radar transmitter means of the station to emit their recurrent radar signals at successive instants of time which correspond to the propagation delay required by the signal to travel to the target (as well as the fixed retransmission delay at the target), whereby the reception times of the recurrent signals emanating from the, or each station at the target can be spread substantially uniformly in time at intervals corresponding to the intervals between the original isochronic time base signals.

According to further features of the invention, means are provided for imparting additional controllable delays at each station of a radar tracking chain, in order to cause to reception times at the target, of signals emanating from different stations of the chain to be spaced in time as required to ensure that the target will be able to respond reliably to interrogating signals emanating from all the stations. Such additional controllable delays may be adjustably fixed or/and variable in response to detected target velocities and other parameters.

Figure 2:
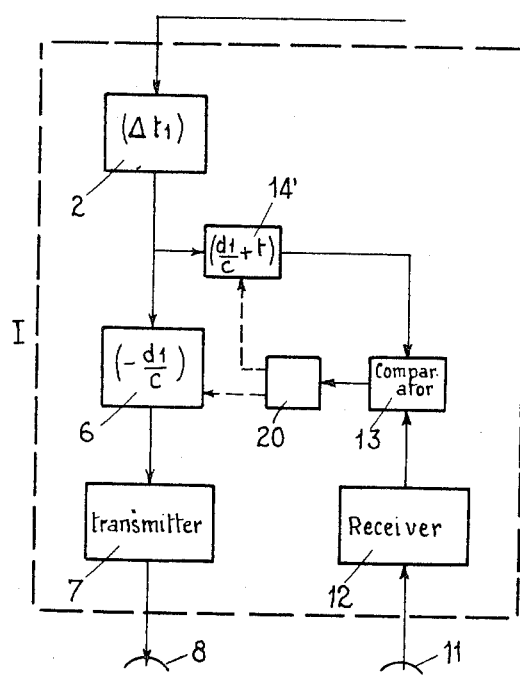

The invention will now be described in fuller detail with reference to the accompanying drawing, given by way of illustration and not of limitation and wherein:

FIG. 1 is a block diagram of a two-station radar system according to the invention; and FIG. 2 is a fragmentary diagram illustrating a modification.

The multi-station radar tracking system schematically shown in FIG. 1 includes the two radar stations I and II. Obviously more may be provided. The stations are assumed to be tracking a common airborne target III. A time-base generator 1, common to all the stations of the chain, generates isochronic time-base signals of fixed repetition rate and applies them to all stations in parallel. Over the transmission path Ia, IIa from the common time-base generator 1 to each of the stations I and II, the signals sustain time delays $t_1$ and $t_2$ which are constant and accurately known.

Within each of the tracking stations I and II, the time-base signals are applied to differential initial-delay means 2 and 2' respectively, in which the signals are differentially delayed by respective amounts $\Delta t_1$ and $\Delta t_2$, serving, according to a feature of the invention to control the relative timing of the reception of signals from the different stations such as I and II at the target, as will be more fully apparent hereinafter. The delays $\Delta t_1$ and $\Delta t_2$ imparted in circuit 2 and 2' may be adjustable and then held constant at the adjusted level, or they may be made variable in dependency on a selected parameter such as target velocity. By way of example, the drawing shows the delay imparted in circuit 2, 2' as including a fixed component adjustable at 3, 3' from a positional control $P_i$, $P_{ii}$, and a variable rate or velocity component applied at 4, and which is automatically variable in accordance with a set of predetermined conditions or law settable by means of a circuit 5 as will be subsequently described in greater detail. It has been found that the provision of the initial-delay means just described in combination with the delay proportional to target range, as described presently, makes it possible to ensure that the signals emitted from the respective stations will be received at the target at controllably spaced intervals, determined with regard to the particular geometry of the tracking chain so as positively to prevent target-response "capture" by any one station.

The initially delayed signals are next passed through a further delay device 6 in which they have imparted thereto a variable (negative) delay (or anticipation) proportional to the quantity $(-d_1/c)$ and $(-d_2/c)$ respectively, where $d_1$ and $d_2$ are the respective distances of the target from each of the stations I and II at the time under consideration, and $c$ is the velocity of electromagnetic waves. By the expression "negative delay" or "anticipation" it is meant that each signal of the recurrent signal train is delayed by a quantity such that its time of transmission anticipates the instant at which it would normally be transmitted in the absence of said delay, by the specified quantity. Thus, if the normal time interval between the recurrent time base signals is $T$, then the delay imparted by the circuit 6 is $(T-d_1/c)$, and that imparted by the corresponding circuit 6' in station II is $(T-d_2/c)$. In yet other words, the variable delay device 6 acts to anticipate on the transmission time of each radar signal within its transmission cycle, by an amount proportional to a preceding range indication so as to cancel, in effect, the time required for the signal to travel from the station to the target. This negatively delayed, or advanced signal is now passed to the conventional radar transmitter unit 7, and radiated by the directional radar antenna 8 towards the target III, where it is received by the target antenna 9 and passed to the receiver-transmitter or transponder device on the target which includes in a conventional manner a transmitter 10T and a receiver 10R, the transmitter 10T being triggered by the receiver as is usual in transponder beacons.

During its travel from the station to the target the signal sustains a propagation delay $d_1/c$ (or $d_2/c$), which cancels the "negative" or anticipatory delay that was previously imparted to it in circuit 6. Hence, the successive signals of the signal train reach the target III at instants that are in fixedly timed relationship with the original time base signals generated at 1, being delayed with respect thereto by the quantities $(t_1+\Delta t_1)$, or $(t_2+\Delta t_2)$ respectively, these quantities being independent of the target range or distance $d_1$ and $d_2$ from the respective stations. The signal trains from the respective stations are thus received at the target as trains of constant, equal repetition rate.

In the target transponder apparatus 10, there occurs a fixed, known delay $t$ constituting the time constant of said apparatus and representing the time required for the target transmitter 10T to be triggered by the receiver 10R (as schematically illustrated in FIG. 1). The retransmitted signal from the target sustains a further propagation delay again equal to $(d_1/c)$ or $(d_2/c)$, and is picked up by the receiving antenna 11 of the ground station. Of course the transmitting and receiving antennas 8 and 11 may be replaced by a common antenna if desired. The response signal is passed from antenna 11 to a conventional receiver 12 and is thence supplied to one input of a range-finding comparator device 13. The other input of the comparator 13 has applied to it the output from a variable-delay device 14 the input of which is fed with the transmitted signal from device 6, in parallel with the transmitter 7. The output from comparator 13 is fed back by way of a suitable servo controller 20 to the variable delay device 14, the adjustments being such that device 14 is at all times set to introduce a follow-up delay corresponding to the quantity $(2d_1/c+t)$ or $(2d_2/c+t)$, that is, a delay corresponding to the two-way propagation time between the ground station and target, plus the target response-time constant. This constitutes in effect a well-known form of negative feedback range-finding servo-system the output signal of which represents at any instant the instantaneous distance or range of the target III from the ground station.

In accordance with the invention, the servo controller 20 simultaneously operates the delay device 6 in order to set it to the desired anticipatory or negative delay $(-d_1/c)$ as earlier described.

The operation of the system will be readily apparent from the foregoing disclosure. The generator 1 produces a uniform or isochronic train of time-base pulses or signals. Each signal is first delayed in the circuit 2 by a controlled amount independent of target distance, and then in the circuit 6 by a further amount which is made dependent on target distance owing to the servo-action of the output from comparator 13 through controller 20 upon the adjustment of circuit 6 so that the signal applied to radar transmitter 7 appears at a point in the time cycle of the signal train, which anticipates the point it would otherwise occur at by a time period of $d_1/c$ or $d_2/c$ equal or substantially equal to the time required for its travelling from the ground station to the target. In this way, the signals from each station such as station I, are received at the target III at substantially constant time intervals, corresponding to the time interval of the time base signals from generator 1, regardless of the target velocity and the changing distance of the target from said station. In the absence of the delay device 6 of the invention, the successive radar signals from a given station, such as station I, would of course be received at the target III at irregular intervals because of the continuously varying station-to-target distance $(d_1)$ and consequent variations in propagation time $(d_1/c)$. The retransmitted signal triggered from target transponder apparatus 10 is received at the ground station receiver 12, and serves to provide the conventional range indication at the output of range-finding comparator 13, this output simultaneously serving by way of controller 20 to effect adjustment of the delay device 6 of the invention as well as that of the error resetting delay device 14 interposed in the conventional range-finding servo-loop as earlier described.

A similar process occurs in relation with each of the remaining ground stations, such as II, of the tracking chain. Thus the signals from each of the stations are received at the target III as a constant-interval signal train. Further, the relative timing as between the signals of the several trains from the respective ground stations, such as I and II, can now be so adjusted, through the initial delay circuit 2, that there will be no mutual interference therebetween and no possibility of target response capture or lock by any one ground station.

The law of time delay variation imposed by the automatic control circuit 5 may for example be preset such that, prior to target acquisition by the radar, the delay introduced into the system increases at a much more rapid rate than the rate of normal increase that would be introduced into the system by the compensating delay circuit 6 during the tracking of the fastest targets that the system is expected to track. In a practical embodiment of the invention, the system was to track targets up to 10 km./sec. in velocity, and the rate of delay injected by device 5 corresponded to a target velocity of 20 km./sec. This precaution guards against the possibility of an erroneous information signal being sensed after momentary loss of information through target capture.

It will be apparent that a great many modifications may be introduced into the single embodiment illustrated and described without exceeding the scope of the invention. Thus, by way of example and referring to FIG. 2, where components corresponding to these of FIG. 1 are similarly numbered, it will be seen that the range-finding servo-loop delay device, herein designated 14′ may have its input connected to the main signal chain ahead of the delay device 6 rather than beyond this device as in FIG. 1, and would then be controlled so as to introduce a delay of $(d_1/c+t)$ instead of $(2d_1/c+t)$ as in the embodiment of FIG. 1. It will be clear that the over-all operation of the system is equivalent to that already described, since the total relative time delay of the transmitted signal applied to the related input of comparator 13, with respect to the time base signals, will again be $(2d_1/c+t)$, as required.

The various system components, and primarily the delay circuits, may assume any suitable practical forms that will readily occur to those familiar with the radar engineering art. Thus, continuous sine-wave phase shifters, electromechanical and/or electronic in character may be used, as well as suitable electronic pulse shifters, as opportunity may dictate.

It will be apparent from the foregoing disclosure that the invention, owing to the anticipatory timing of the transmitted signals achieved by means of the delay device 6 under control of the range indication derived from comparator 13, makes it possible to ensure that the signals from the, or each, radar station are received at the target as a uniform signal train despite the ever-changing station-to-target distance. This in turn makes it possible to ensure, by means of the initial delay device 2, that the instants of reception, at the target, of signals from different stations are spread out in time in such a manner as positively to preclude target lock or response capture by any one station and consequent loss of track by the system. In this connection it should be noted that while especial stress has been laid on the defective condition, common in conventional tracking systems, where signals from two different stations reach the target at times so close to each other that the target cannot respond to the second signal and remains locked to the first signal train, this defect is but one example of the various interference situations liable to arise in prior-art tracking systems and to interfere with the proper functioning of a tracking process. While a complete analysis of such interference situations would be too complex to be given herein, it may be indicated that as the time interval between the reception times, at the target, of signals from different stations varies continuously with the varying position of the target, said interval is liable to transverse a series of critical values at each of which there exists a danger of target lock or capture by one station and loss of target by others. In some such cases a station that has lost track may continue tracking "by memory." However there are situations in which a target capture by one station is directly superseded by target capture by another station, in which case the first station will tend to synchronize with the target response to the second station, since the substitution of response from one to the other station occurs without any positional discontinuity, but only with a discontinuity in velocity. These and similar occurrences depend essentially on the geometry of the tracking chain and the relationship therewith of the target flight path. In the system of the invention, it becomes possible to eliminate, or greatly reduce, the likelihood of any such interference effects occuring between stations of a tracking chain, specifically through the action of the initial delay device 2 with its positional and/or velocity controls which can be adjusted with due regard to the afore-mentioned geometrical and velocity parameters. It is again emphasized however that the basic provision that makes possible the above results is the anticipatory delay circuit 6 of the invention achieving synchronism of signal reception time at the target.

What I claim is:

1. A method of radar-tracking a moving target comprising generating an isochronic series of time base signals at a station, deriving from said series of time base signals a train of radar signals and cyclically transmitting the same towards the target, receiving a train of response signals from the target deriving time-shifted signals from one of said trains, time-comparing the time-shifted signals with the signals of the other train and continuously varying the time shift in response to the result of said comparison so as to bring the time-shifted signals into substantial coincidence with said other train signals advancing the transmission time of each signal of the train of radar signals within its transmission cycle and continuously varying the amount of advance in response to the result of said comparison and in proportion to the variations in said time shift, thereby causing the transmitted radar signals to reach the target as a substantially isochronic train having a repetition rate corresponding to that of said time base signals.

2. A method of radar-tracking a moving target comprising generating an isochronic series of time base signals, deriving from said series of time base signals at each of a plurality of mutually-spaced tracking stations a respective train of radar signals and cyclically transmitting said train towards the target, receiving a train of response signals from the target at said stations deriving time-shifted signals from one of said trains at each station, time-comparing the time-shifted signals with the signals of said other train at each station and continuously varying the time shift of said time-shifted signals in response to the result of said comparison to bring the time-shifted signals into substantial coincidence with the signals of the other train whereby to track the target, advancing the transmission time of each signal of the train of radar signals within its transmission cycle at each station and continuously varying the amount of advance in response to the time comparison and in proportion to the variations in said time shift at said station, whereby to cause the radar signals from all the stations to reach the target as substantially isochronic trains having equal repetition rates corresponding to that of the time base signals, and further selectively varying the transmission time of the radar signals within the transmission cycle at each station by controlled amounts whereby to cause the signal trains from different stations to reach said target at instants selectively distributed in time.

3. A radar system comprising at least two radar stations having means for transmitting respective trains of recurrent radar signals towards a common target and means for receiving response signals from the target, time-comparator means at each station having two inputs, one of said inputs being connected to said receiving means and having an output, a variable follow-up delay device connecting the other of said inputs to said transmitting means, and servo means connected to the comparator output and connected to vary said follow-up device in a sense to reduce the comparator output signal, and thereby deriving indications of station-to-target distance, variable delay means interposed in the path of the transmitted signals at each station and connected for operation by the related servo means so as to vary the transmission timing of the recurrent signals in proportion to variations in said distance indication whereby the signals from the respective stations are received at the target as respective signal trains having generally uniform repetition rates substantially independent of variations in station-to-target distance, further delay means interposed in the transmitted signal path at each station, and means for selectively controlling the further delay means at the respective stations whereby the signal trains from the respective stations will reach the target at instants controllably distributed in time.

4. A radar system comprising a radar station having means for transmitting a train of recurrent radar signals towards a target and means for receiving response signals from the target, time-comparator means at the station having two inputs, one of said inputs being connected to said receiving means and having an output, a variable follow-up device connecting the other of said inputs to said transmitting means, and servo-means connected to the comparator output and connected to vary said follow-up device in a sense to reduce the comparator output signal for tracking the target and deriving an indication of station-to-target distance, and variable delay means interposed in the path of the transmitted signals at said station and connected for operation by said servo means whereby to vary the transmission timing of the recurrent signals in proportion to variations in said distance indication and whereby the signals are received at the target at generally uniform intervals substantially independent of variations in station-to-target distance.

5. The system claimed in claim 4, wherein said target has signal receiving means and signal transmitting means triggered by said receiving means to retransmit said response signals.

6. In a radar system including a radar station having time base means providing recurrent time base signals at constant intervals, means for transmitting radar signals towards a target in timed relation with said time base signals and means for receiving response signals from the target, and servo follow-up tracking means at said station including means for time-comparing the signals transmitted therefrom and received thereby and means operated in response to the result of said comparison to derive an indication of target range; the provision of means at said station for advancing the transmission times of said radar signals with respect to said time base signals and means connected to said servo follow-up means and connected to said advancing means for varying the advance by amounts proportional to the variation in output of said comparing means, whereby said radar signals will reach the target at substantially constant intervals corresponding to the intervals between time base signals.

7. In a radar system including at least two radar stations having common time base means providing recurrent time base signals at constant intervals, means at each station for transmitting radar signals towards a common target in timed relation with said time base signals and means at each station for receiving response radar signals from the target, and servo follow-up tracking means at each station including means for time-comparing the signals transmitted therefrom and received thereby and means operated in response to said time-comparing means to derive indications of target range: the provision of means at each station for advancing the transmission times of said radar signals with respect to said time base signals and means connected to said servo follow-up tracking means and said advancing means for varying the advance by amounts proportional to the variations in comparing means output, whereby the radar signals from each station will reach the target at substantially constant intervals corresponding to the intervals between time base signals, and selective delay means connected to the transmission means at each station for imparting a selected delay to the signals transmitted thereby whereby the signals from the respective stations will reach the common target at instants selectively displaced in time.

8. The system claimed in claim 7, including means for adjusting said selective delay means to impart respective delays in accordance with the geometrical relationship of said stations to avoid capture of target response by any one station.

9. The system claimed in claim 7, including means connected to said selective delay means for automatically varying the delay imparted thereby.

10. The system claimed in claim 7, wherein the means for advancing the transmission timing comprises a variable delay device interposed in the path of said time base signals to the station transmitter, and connected for operation from the output of the servo means.

11. In a radar system including at least two radar stations having common time-base means providing recurrent time-base signals at constant intervals, means at each station for transmitting radar signals towards a common target in timed relation with said time-base signals and means at each station for receiving response radar signals from the target, time-comparing means at each station having one input connected to be supplied with response signals from the station receiving means and another input connected to be supplied with the transmitted signals, and a first variable delay device connected in the path of said transmitted signals to said other input of the comparing means; the provision of a further variable delay device at each station interposed in the path of said time-base signals to the station transmitting means, a common controller device connected for operation from the output of said time-comparing means and forming a negative-feedback connection to control said first delay device in accordance with target distance and connected to control said further delay device to advance the transmission times of said radar signals with respect to said time-base signals by amounts proportional to said target distance, whereby the radar signals from each station will reach the target at substantially constant intervals corresponding to the intervals between time base signals, and selective delay means connected to the transmission means at each station for imparting a selected delay to the signals transmitted thereby whereby the signals from the respective stations will reach the common target at instants selectively displaced in time.

12. The system claimed in claim 11, wherein said other input of the comparing means is connected to a point of the transmitted signal path beyond said further variable delay device, and said common controller device controls the respective variable delay devices so that said first device introduces a variable delay that is substantially twice the absolute value of the advance in transmission time introduced by said further variable delay device.

13. The system claimed in claim 11, wherein said other input of the comparing means is connected to a point of the transmitted signal path ahead of said further variable delay device, and said common controller device controls the respective variable delay devices so that said first device introduces a variable delay that is substantially equal in absolute value to the advance in transmission time introduced by said further variable delay device.

References Cited by the Examiner

UNITED STATES PATENTS

| | | | |
|---|---|---|---|
| 2,452,598 | 11/1948 | Page | 343—13 |
| 3,150,370 | 9/1964 | Lisicky | 343—7.5 X |

CHESTER L. JUSTUS, *Primary Examiner.*